(12) United States Patent
Zich et al.

(10) Patent No.: US 8,096,533 B2
(45) Date of Patent: Jan. 17, 2012

(54) PACKING ARRANGED FOR AN EXCHANGE OF HEAT AND/OR MATERIAL

(75) Inventors: Egon Zich, Leichlingen (DE); Helmut Jansen, Dormagen (DE); Thomas Rietfort, Bottrop (DE); Björn Kaibel, Hilden (DE)

(73) Assignee: Julius Montz GmbH, Hilden (DE)

( * ) Notice: Subject to any disclaimer, the term of this patent is extended or adjusted under 35 U.S.C. 154(b) by 1153 days.

(21) Appl. No.: 11/805,450

(22) PCT Filed: Nov. 23, 2005

(86) PCT No.: PCT/EP2005/012536
§ 371 (c)(1),
(2), (4) Date: May 23, 2007

(87) PCT Pub. No.: WO2006/056419
PCT Pub. Date: Jun. 1, 2006

(65) Prior Publication Data
US 2009/0020896 A1    Jan. 22, 2009

(30) Foreign Application Priority Data
Nov. 23, 2004   (DE) .......................... 10 2004 056 419

(51) Int. Cl.
*B01F 3/04*   (2006.01)
(52) U.S. Cl. ................. 261/97; 261/112.2; 261/DIG. 72
(58) Field of Classification Search ................... 261/94, 261/97, 112.1, 112.2, DIG. 72
See application file for complete search history.

(56) References Cited

U.S. PATENT DOCUMENTS

| | | | | |
|---|---|---|---|---|
| 5,124,086 A * | 6/1992 | Schultz | ...................... | 261/112.2 |
| 5,167,879 A * | 12/1992 | Streng | ......................... | 261/112.2 |
| 6,206,349 B1 * | 3/2001 | Parten | ........................ | 261/112.2 |
| 6,286,818 B1 * | 9/2001 | Buhlmann | ...................... | 261/97 |
| 6,427,985 B1 * | 8/2002 | Kaibel et al. | ............... | 261/112.2 |
| 6,672,572 B2 | 1/2004 | Werlen | | |
| 7,052,000 B2 | 5/2006 | Zich et al. | | |
| 7,267,329 B2 * | 9/2007 | Sunder | ........................... | 261/95 |
| 7,559,539 B2 | 7/2009 | Zich | | |
| 2003/0090009 A1 * | 5/2003 | Zich et al. | ........................ | 261/97 |
| 2004/0150123 A1 * | 8/2004 | Strofer et al. | ................... | 261/95 |

FOREIGN PATENT DOCUMENTS

DE         19706544 A       3/1998
DE   10 2004 013 381 A1   10/2005

* cited by examiner

*Primary Examiner* — Scott Bushey
(74) *Attorney, Agent, or Firm* — Andrew Wilford

(57) ABSTRACT

A stacked packing column for heat and/or mass transfer has individual horizontal layers including a lower layer that has a greater density that initiates an accumulation, in particular flooding, and that is 1.5 to 10, preferably 2 to 3 times, greater than the density of an overlying upper layer. The upper layer forms oblique flow channels having lower sections that are more vertically aligned than respective upper sections. The lower sections of the flow channels have a larger cross section than the upper sections, and the sections of larger cross section open into the lower layer.

11 Claims, 3 Drawing Sheets

PACKING ARRANGED FOR AN EXCHANGE OF HEAT AND/OR MATERIAL

CROSS REFERENCE TO RELATED APPLICATIONS

This application is the US national phase of PCT application PCT/EP2005/012536, filed 23 Nov. 2005, published 1 Jun. 2006 as WO 2006/056419, and claiming the priority of German patent application 102004056419.1 itself filed 23 Nov. 2004, whose entire disclosures are herewith incorporated by reference.

The invention relates to a stacked packing for heat and/or mass transfer comprising individual, in particular horizontal, layers, at least one layer of the column having a greater density and thus having a specific surface for an accumulation, in particular flooding, the specific surface being 1.5 to 10, preferably 2 to 3 times, greater than the specific surface of the overlying layer that can also be used as a liquid distributor for packed and/or filled columns.

In EP 1 074 296 [U.S. Pat. No. 6,427,985] a stacked packing is described where the individual packings are each formed of two separate packing layers of different geometry. Here the lower packing layer is of tighter geometry than the upper packing layer. The packing is operated such that the lower packing layer is made to bubble with high mass transfer. The overlying coarser packing layer separates out the bubbles and has film flow so that it works like a conventional packing.

DE 100 10 810 [U.S. Pat. No. 7,052,000] describes a packing in which individual packing layers having a narrow geometry are combined with packing layers having a wide geometry. The packings are operated in such a way that the packing layers with a narrow geometry are changed to a bubbled state in a targeted manner, thereby uniformly distributing the liquid over the cross section of the column.

In both packing assemblies the aim is to achieve the broadest possible operating range in which the packings fulfill their respective purpose. Heretofore this has been achieved by ensuring that in the selection of the specific packing surfaces the ratio of packing layers with a wide geometry to packing layers with a narrow geometry is at least a factor of 3. A wider operating range, which in practice is usually necessary, in particular of 1:2 and greater can only be achieved for packing surfaces in which the factor is 4 and greater. However, at these great differences very large specific packing surfaces of 1000 $m^2/m^3$ and above result in which the hydraulic diameters of the stacked packing reach values of 3 mm and less. According to the invention, these packings are very susceptible to contamination.

A further disadvantage of these high specific surfaces occurs with liquids having high surface tensions. It has been shown that for packing layers having a specific surface of 1000 $m^2/m^3$ and greater, during operation some of the flow channels in the packing layers are permanently hydraulically sealed by the liquid. This phenomenon occurs not in a uniformly distributed manner over the packing cross section, but instead occurs in a fairly large contiguous region of a packing layer. This alters the operational characteristics of the packing assembly in such a way that the packings undergo premature hydraulic failure in a random, poorly reproducible manner, and the equipped column floods much earlier, thus reducing the operating region.

The object of the present invention is to provide a packing assembly that has a simple design and offers a broader operating region without increasing the ratio of the narrow packing layer to the wide packing layer to a factor greater than 3.

A further object of the invention is to improve a packing of the above-described type in such a way that a highly efficient heat and/or mass transfer is achieved. It is a particular object of the invention to improve the liquid throughput in packing layers having a density greater than that of the overlying or underlying packing layers.

This is achieved by the invention by the fact that the layer situated above the high-density layer forms oblique flow channels that in their lower sections adjoining the high-density layer are aligned more vertically than in the upper sections, and that in their lower sections the flow channels have a larger cross section than the upper sections, the larger cross section opening into the underlying layer.

These packing layers having height-adjustable flow channel angles, in combination with packing layers having a narrow geometry, provide a much broader operating range. A low packing height results in high-efficiencies, optimal operation of the bubble layer, and low pressure losses.

Advantageous embodiments of the invention are stated in the subclaims.

Illustrated embodiments of the invention are illustrated in the drawings and described below in greater detail. The drawings show the following:

Figure 1A:
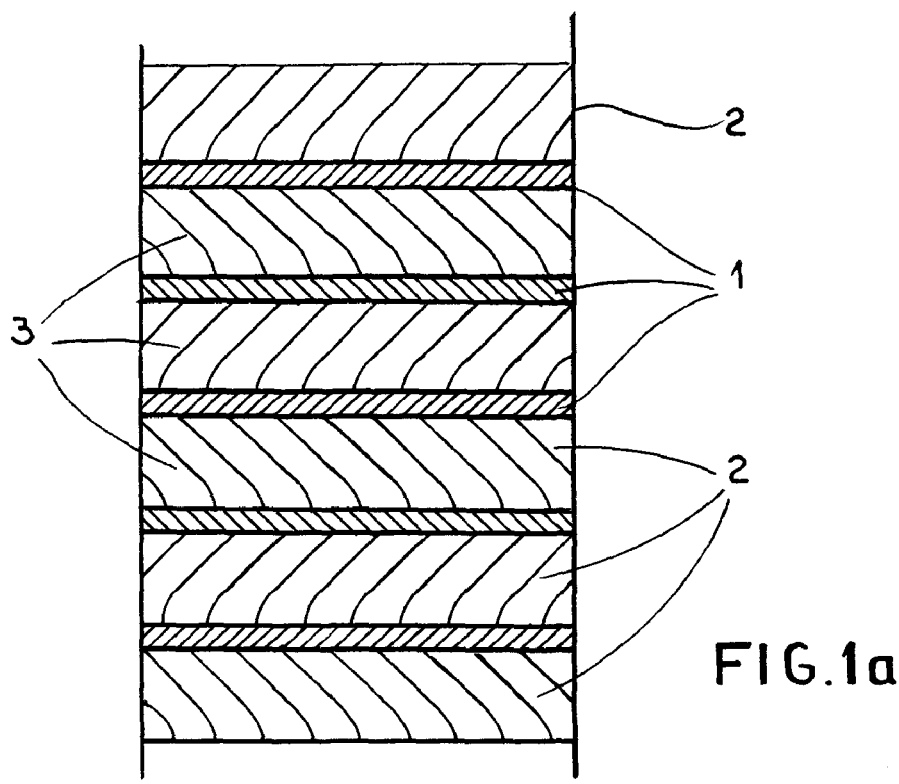
FIG. 1a shows high-density layers, each with an overlying low-density layer.
Figure 1B:
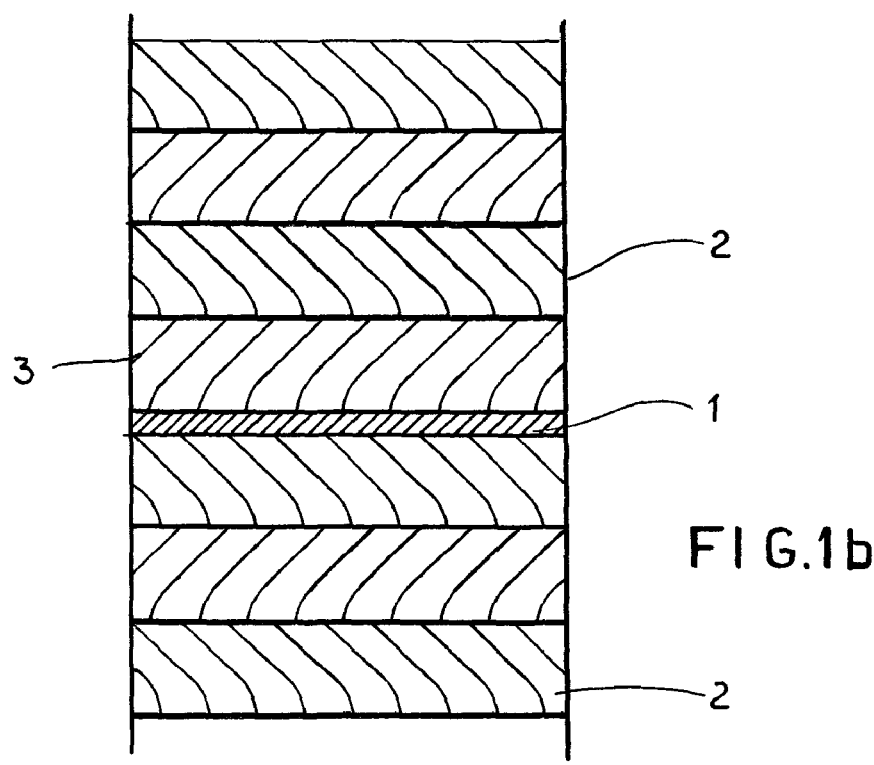
FIG. 1b shows multiple low-density layers above a high-density layer.

One design is shown by way of example in FIGS. 1a and 1b. Known packing layers may be used as a packing layer having a wide geometry and flow channels of varying slopes. Examples of such include M packings from Julius Montz GmbH, Hilden, or MellapakPlus or BXPlus packings from Sulzer Chemtech, Winterthur having curved flow channels. However, HC packings from Koch-Glitsch, Wichita may also be used. Preferably used are packing layers having a modified flow channel angle only in the lower section of the packing layer. Particularly preferred are packings having a pronounced curve, located in the lower section of the packing layer, which has a height of up to ⅓ of the overall packing layer height.

FIG. 1a shows high-density packing layers 1 alternating with low-density layers 2, the layers 2 in their regions adjacent the high-density layer 1 being aligned more vertically than in their upper sections, and the flow channels in their lower sections having a larger cross section than the upper sections, the cross sections opening into the underlying layer (1). As a result, the bubble layer situated above the high-density layer 1 extends into the flow channels of the low-density overlying layer 2. The lower ends 3, i.e. sections of the flow channels, thus form above layer 1 expanded spaces into which the bubble layer-extends.

Figure 2A:
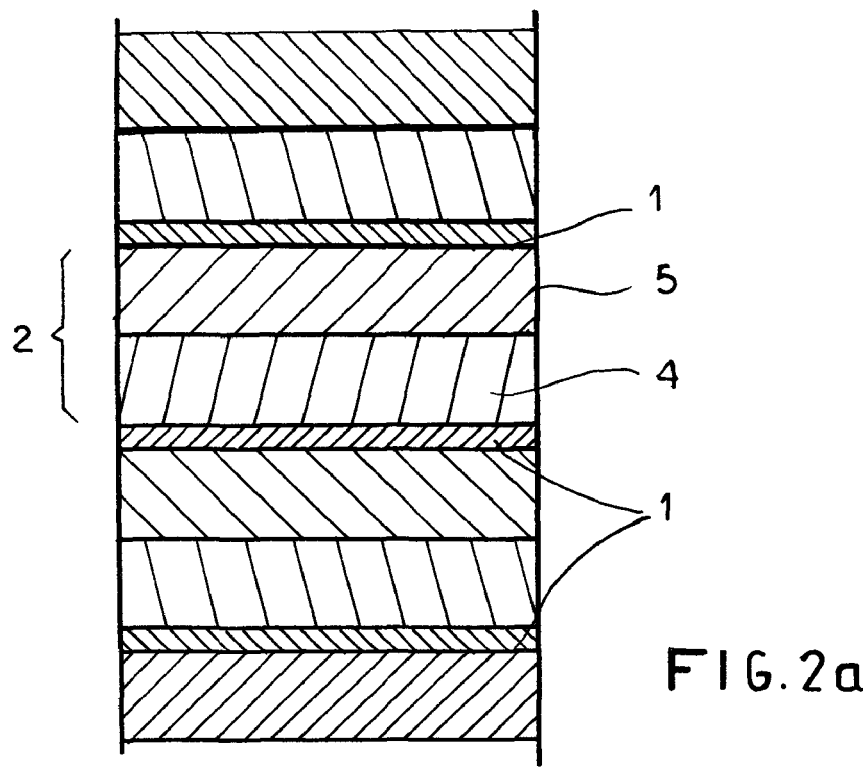
FIG. 2a shows high-density layers, each with an overlying low-density layer, the low-density layers being composed of two layers whose channels/ribs merge in a secant shape.

For this purpose, the flow channels in the low-density layer are preferably provided between ribs of perforated and/or slotted sheets. The ribs may be continuously curved, or obliquely positioned ribs may be straight, and the ribs of two or more overlying layers may together form a secant-shaped curvature as illustrated in FIGS. 2a and 2b.

Figure 2B:
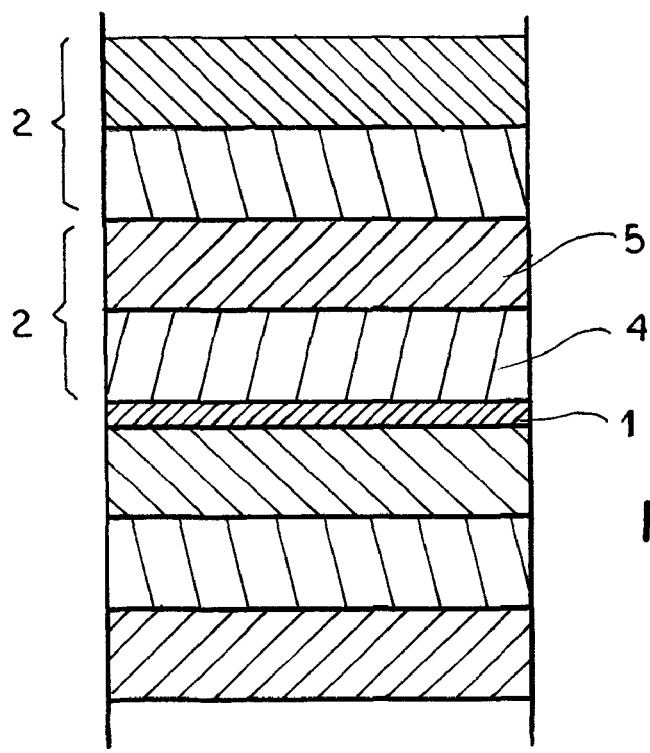
FIG. 2b shows multiple low-density layers above a respective high-density layer, the low-density layers being composed of two layers whose channels/ribs merge in a secant shape.
Figure 3:
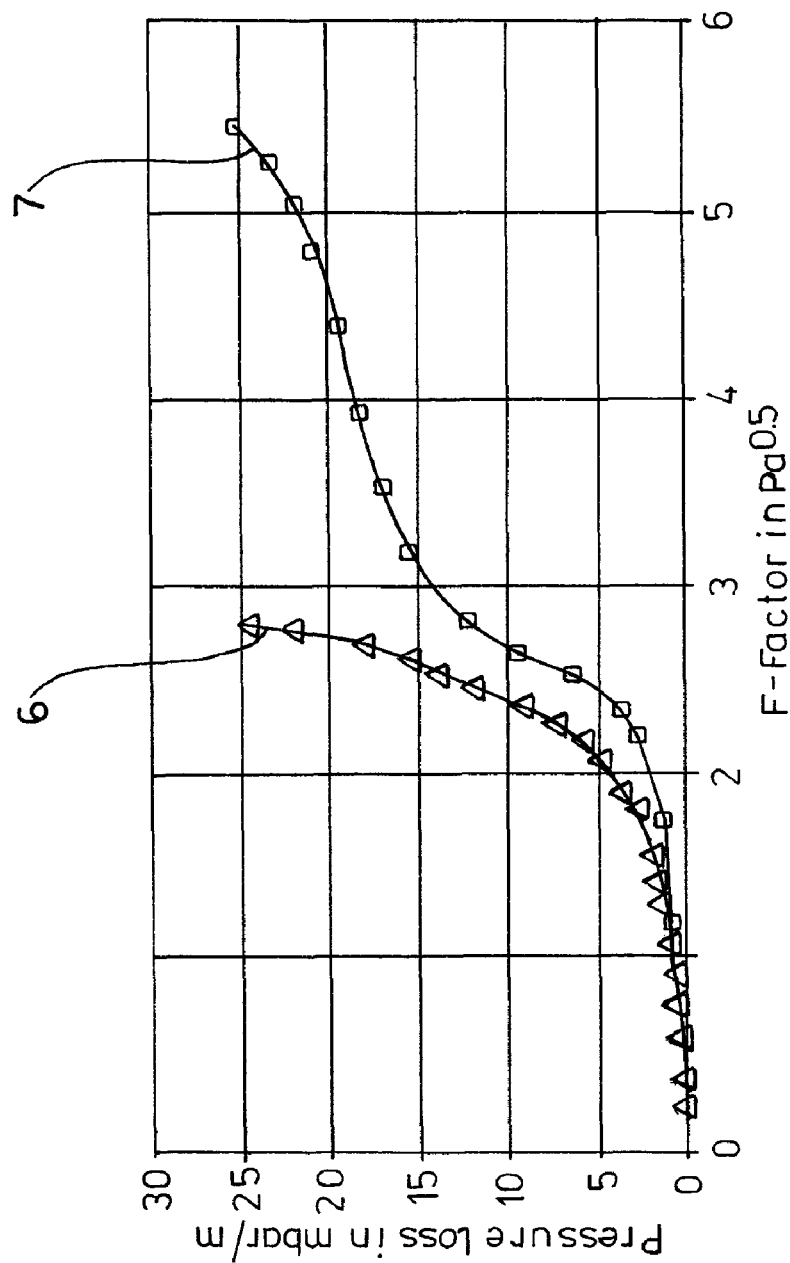
FIG. 3 shows the pressure loss curve foreknown designs (6) and designs (7) according to the invention, using an air/water test system with a drip density of 10 $m^3/m^2h$ and a density ratio of 3.

Instead of alternating layers, two or more low-density layers 2 may be situated above the high-density layers, as shown in FIGS. 1b and 2b.

Storage vessels (not illustrated) are preferably uniformly introduced in the high-density packing layer 1, over the surface thereof, the storage vessels being completely or partially open on their upper side and having outlet openings in their floor and/or side surfaces (DE 102004013381.6). The sum of all opening surfaces of all the outlet openings results in San overall outlet surface that is smaller than the overall inlet surface of the upper inlet opening(s).

Small round cups having perpendicular side wall(s) represent one preferred design of the device for conducting liquids. Holes are provided in the bases of these cups. The sizes of the holes and the number of holes per cup depends on the particular application, and are calculated on an individual basis.

The invention claimed is:

1. A packing comprising:
   a horizontal lower layer through which liquid can rise and of a predetermined density; and
   a horizontal upper layer atop the lower layer and formed with a multiplicity of flow passages each having an upright lower portion opening at the lower layer, extending at an acute angle to the vertical, and of a predetermined flow cross-section and an oblique upper portion extending upward from the respective lower portion, of a predetermined flow cross section smaller than that of the respective lower portion, and forming with the vertical an acute angle greater than the angle of the respective lower portion, the lower layer being of a density equal to between 1.5 and 10 times a density of the upper layer.

2. The stacked packing according to claim 1 wherein, so that the packing may also be used as a liquid distributor, the lower layer of the column allows flooding for the distribution of the liquid.

3. The stacked packing according to claim 1, wherein the lower layer has a bubble layer that extends upward from the lower high-density layer into the flow passages of the overlying low-density upper layer.

4. The stacked packing according to claim 1 wherein the flow passages in the low-density upper layer are provided between ribs of perforated or slotted sheets.

5. The stacked packing according to claim 4 wherein the ribs are continuously curved.

6. The stacked packing according to claim 4 wherein the ribs are oblique and straight, and the ribs of two or more overlying layers together form a secant-shaped curvature.

7. The stacked packing according to claim 1, further comprising individual storage vessels inside the packing layer, the storage vessels being completely or partially open on their upper side and have outlet openings in their floor or side surfaces.

8. The stacked packing according to claim 7 wherein a sum of surface areas of all the outlet openings is smaller than a sum of surface areas of all the upper inlet openings.

9. The stacked packing according to claim 7 wherein the storage vessels are provided in packing layers having a greater density or a narrower geometry than at least one overlying or underlying packing layer.

10. The stacked packing according to claim 7 wherein the packing layers having storage vessels have a lower height than the packing layers not having storage vessels.

11. The packing defined in claim 1 wherein the density of the lower layer is 2 to 3 times the density of the upper layer.

* * * * *